United States Patent
Lentz et al.

(10) Patent No.: US 11,355,457 B2
(45) Date of Patent: Jun. 7, 2022

(54) FULLY DIGITAL GLITCH DETECTION MECHANISM WITH PROCESS AND TEMPERATURE COMPENSATION

(71) Applicant: NXP B.V., Eindhoven (NL)

(72) Inventors: Andreas Lentz, Buchholz (DE); Stefan Heyse, Quickborn (DE); Martin Heinrich Butkus, Hamburg (DE); Oliver Alexander Schmidt, Hamburg (DE)

(73) Assignee: NXP B.V., Eindhoven (NL)

( * ) Notice: Subject to any disclaimer, the term of this patent is extended or adjusted under 35 U.S.C. 154(b) by 309 days.

(21) Appl. No.: 16/445,650

(22) Filed: Jun. 19, 2019

(65) Prior Publication Data

US 2020/0402929 A1 Dec. 24, 2020

(51) Int. Cl.
*H01L 23/00* (2006.01)
*H03K 19/20* (2006.01)
(Continued)

(52) U.S. Cl.
CPC .......... *H01L 23/576* (2013.01); *G06F 21/556* (2013.01); *H03K 3/011* (2013.01);
(Continued)

(58) Field of Classification Search
CPC .................. H01L 23/576; G06F 21/556; G06F 2221/034; H03K 3/011; H03K 3/037; H03K 5/00; H03K 19/20; H03K 2005/00078
See application file for complete search history.

(56) References Cited

U.S. PATENT DOCUMENTS 4,107,651 A 8/1978 Martin
6,144,242 A * 11/2000 Jeong .................... H04L 25/085
327/269

(Continued)

FOREIGN PATENT DOCUMENTS

TW 201512684 A 4/2015
WO WO 2014190666 A1 12/2014
WO WO 2015006036 A1 1/2015

OTHER PUBLICATIONS

Gnad et al., "An Experimental Evaluation and Analysis of Transient Voltage Fluctuations in FPGAs," IEEE Transactions On Very Large Scale Integration (VLSI) Systems, vol. 26, No. 10, Oct. 2018, 14 pages.

(Continued)

*Primary Examiner* — Daniel C Puentes

(57) ABSTRACT

A fully digital method and apparatus are provided for detecting glitches on a monitored line by providing a toggle signal to an initial delay circuit and a plurality of delay elements formed with standard logic cells so that logic values from the delay elements are captured in a corresponding plurality of clocked capture flops to provide a digitized representation of a delay value during a sampling period which is converted to a numerical measurement result which is evaluated against a reference value to generate an output error signal if a difference between the numerical measurement result and reference value exceeds a programmable margin, where the initial delay circuit is configured with a trim setting to impose an initial delay to compensate for process variations and where the reference value is adapted over a plurality of sampling periods to compensate for temperature effects on the numerical measurement result.

20 Claims, 7 Drawing Sheets

(51) Int. Cl.
*H03K 3/037* (2006.01)
*H03K 5/00* (2006.01)
*G06F 21/55* (2013.01)
*H03K 3/011* (2006.01)

(52) U.S. Cl.
CPC ............... *H03K 3/037* (2013.01); *H03K 5/00* (2013.01); *H03K 19/20* (2013.01); *G06F 2221/034* (2013.01); *H03K 2005/00078* (2013.01)

(56) References Cited

U.S. PATENT DOCUMENTS

| | | | |
|---|---|---|---|
| 2015/0015283 A1 | 1/2015 | Park et al. | |
| 2015/0077279 A1* | 3/2015 | Song | G04F 10/005 341/155 |
| 2018/0198439 A1* | 7/2018 | Hsu | H03K 5/133 |
| 2019/0005269 A1 | 1/2019 | Regner et al. | |
| 2020/0013440 A1* | 1/2020 | Kim | G11C 29/028 |
| 2020/0402602 A1* | 12/2020 | Mahatme | G11C 29/50012 |

OTHER PUBLICATIONS

Zick et al., "Sensing Nanosecond-scale Voltage Attacks and Natural Transients in FPGAs," FPGA '13, Feb. 11-13, 2013, 4 pages.

Dennis R. E. Gnad et al., An Experimental Evaluation and Analysis of Transient Voltage Fluctuations in FPGAs, IEEE Transactions on Very Large Scale Integration (VLSI) Systems, vol. 26, Issue: 10, Oct. 2018.

Kenneth M. Zick et al., Sensing nanosecond-scale voltage attacks and natural transients in FPGAs, Proceedings of the ACM/SIGDA International Symposium on Field Programmable Gate Arrays, Monterey, California, Feb. 11-13, 2013, pp. 101-104.

* cited by examiner

FULLY DIGITAL GLITCH DETECTION MECHANISM WITH PROCESS AND TEMPERATURE COMPENSATION

BACKGROUND OF THE INVENTION

Field of the Invention

The present invention is directed in general to the field of security protection in data processing systems. In one aspect, the present invention relates generally to a method and apparatus for protecting against fault attacks (most prominently glitch attacks) on data processing system.

Description of the Related Art

Data processing systems, such as automotive controller chips, set-top box systems, chip cards, and other System-On-Chip (SOC) circuits, whose signals or data convey confidential or secret information, are increasingly subjected to attacks to reach or process stored data. While various techniques are used to secure the protected data with protecting circuits and/or data encrypting algorithms, the value of the protected data results in such systems being the target of security or hacking attacks, such as game console attacks (which use a FPGA to glitch one line of the memory bus), cipher attacks (which flip a single bit in RSA decryption process to get additional information about the private key), key transfer attacks (which set parts of a key to zero during the transfer to derive the key's complete value), Cisco activity attacks (using the "Autonomous bootstrap configuration of the secure boot process" feature to recalculate the BOOT_MAC), and power glitch attacks (which use security tools, such as the ChipWhisperer® system, to change the core behavior). One prominent hacking technique is a so-called glitch attack whereby a voltage spike is applied. Against such attacks, a glitch filter is provided on the system to avoid the natural and short-time noise, fluctuations, oscillations (e.g., on supply lines), and the like that will cause the SoC to react and drive a reset. By introducing a voltage spike to an internal bus or signal line, I/O port, power supply, reset or clock line of a data processing system which is filtered by device-internal glitch-filters to drive the device out of specification range (for a small time), the system may be placed in an unstable and/or unpredictable state that allows the attacker to either obtain or reveal secret device-internal information, to violate the integrity of secrets, and/or to maliciously influence the device to cause damage. For example, a hacker may inject a voltage glitch on a voltage supply to temporarily shift the threshold voltages of transistors or logic gates, causing the hardware to skip certain commands or procedures which provide safety checks so that the hacker can take control of portions of the logic, hijack data before it is encrypted, obtain information regarding device architecture or the protected data itself, etc.

In order to avoid or prevent such undesired attacks on the confidential data, security protection countermeasures are used to block or detect hacking techniques. For example, glitch detector circuits can be connected to the supply lines in an appropriate way to detect glitches on the supply lines. Unfortunately, existing glitch detectors are often implemented with analog sensors, such as voltage sensors, which are not easily portable to other process nodes, such as the advanced process nodes like 16 nm FinFET, which make the integration of analog systems more and more difficult. In addition, today's implemented glitch filters are not capable of differentiating between a "harmless" glitch, such as those caused by noise on a supply line, and an "offensive" glitch caused by a hacker. In addition, the normal environmental operating conditions for an SoC circuit can be changed in a way that detrimentally impacts the ability to detect and distinguish background noise from legitimate glitch attacks.

As seen from the foregoing, the existing solutions for detecting and preventing glitch attacks are extremely difficult at a practical level by virtue of the difficulty balancing the design constraints for providing security protection to data processing systems with performance and availability demands and the need to filter natural and short-time noise, fluctuation, oscillation (e.g., on supply lines), and the like.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A digital glitch security detection system, apparatus, and methodology are described for using standard cells in the digital chip to allow continuous protection against supply voltage glitches by using a delay line to monitor glitch attacks on a monitored line (e.g., the power supply to the delay line elements) applying digital post-processing to a digital measurement result captured from the delay line by a measurement unit to compare the digital measurement result against a computed reference value to detect if the difference exceeds a programmable margin, in which case an error signal is raised. In selected embodiments, digital glitch security detection hardware provides a measurement unit having a delay line formed with a sequence of delay elements to evaluate a glitch-induced delay in a delay line and to convert the detected delay into a digital measurement result. In the measurement unit, an initial delay section or setup portion may be configured with a trim setting to remove manufacturing/fabrication process impact with an initial delay setting, thereby allowing compensation for the impact of fabrication process changes. In addition, the measurement unit may include an "OR" line and an "AND" line which receive outputs from the delay line with each clock cycle to remove edge of a previous cycle from capture result by passing it through the "OR" line (to capture a falling edge) or an "AND" line (to capture a rising edge), thereby enabling time-wise complete coverage that provides the highest security with the least area overhead by eliminating the need for a duplicate delay line. In the digital post-processing, the reference value may be modified automatically over time to compensate for the influence of temperature changes during operation on the digital measurement result. By providing glitch security detection hardware that is fully constructed from standard logic library elements, the glitch detector is synthesizable and can be easily adapted to different process nodes. In addition, the behaviour of the glitch security detection hardware with regards to supply voltage will be as close as possible to the logic it shall protect.

Figure 1:
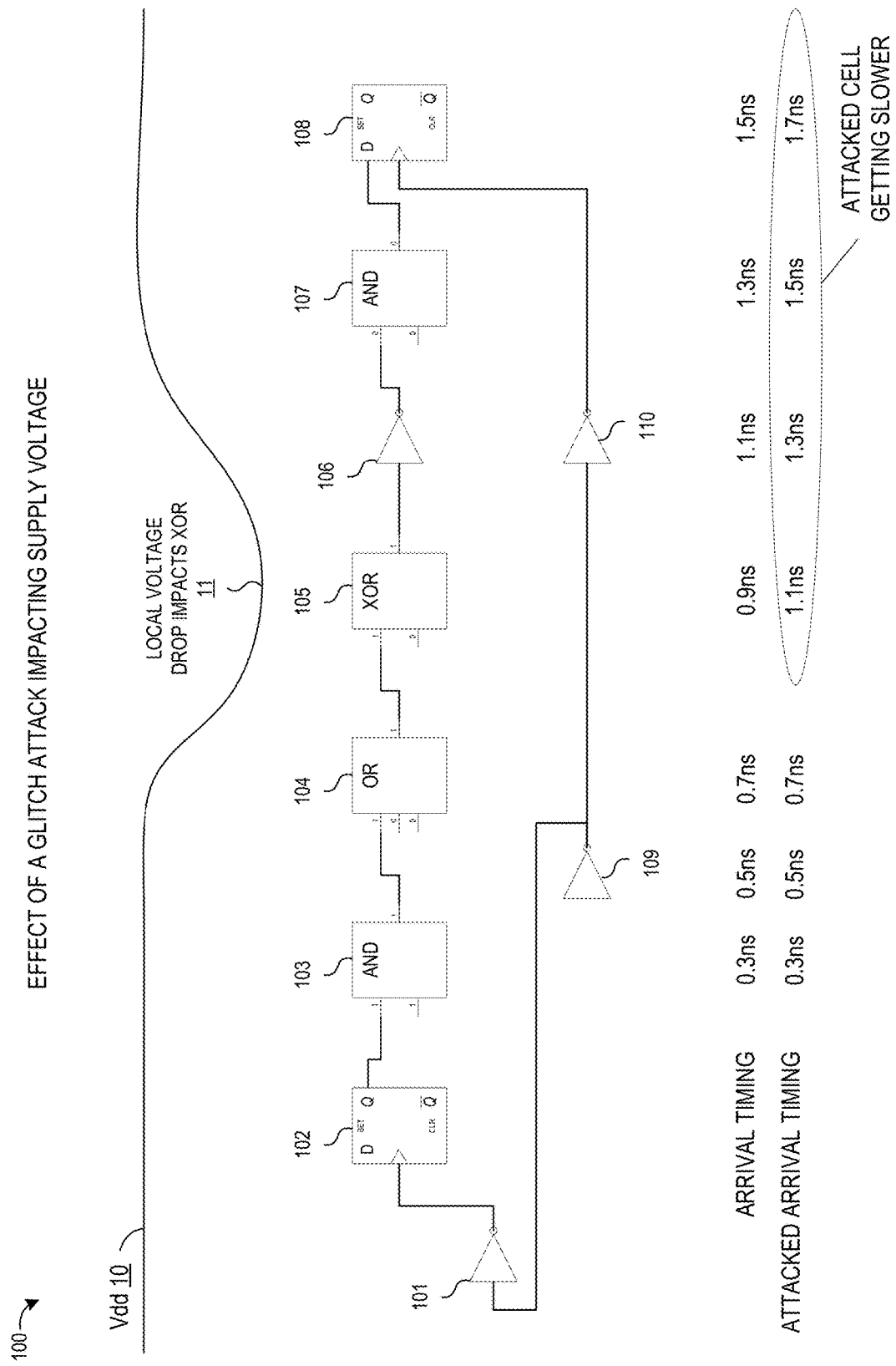
FIG. 1 is a diagrammatic illustration of the effect of a voltage glitch attack on a supply voltage line which changes the behavior of a circuit.

To provide a contextual understanding for selected embodiments of the present disclosure, reference is now made to FIG. 1 which is a diagrammatic illustration 100 of the effect of a voltage glitch attack on a supply voltage line which changes the behavior of a circuit. As illustrated, a reference supply voltage Vdd waveform 10 is shown in which a voltage glitch 11 has been induced resulting from a glitch attack. While a variety of glitch attacks could be used to create positive or negative glitches, FIG. 1 illustrates a voltage glitch 11 which results in a local Vdd voltage drop that impacts the performance of an element (e.g., XOR gate 105) in a digital circuit 101-110. For example, the depicted digital circuit 101-110 includes an example sequence of circuit elements, such as inverters (e.g., 101, 106, 109, 110), flip-flops (e.g., 102, 108), and logic gates (e.g., AND gates 103, 107, OR gate 104, and XOR gate 105) which are connected in a circuit path to receive one or more inputs and to generate outputs from each circuit element. In normal operation of the digital circuit 101-110, an inverted input signal from the inverter 101 would be output from the flip-flop 102 to arrive at the AND gate 103 at a first arrival time (e.g., 0.3 ns) and subsequently cascade through the OR gate 104, XOR gate 105, inverter 106, AND gate 107, and flip-flop 108 at the indicated arrival times. However, when a glitch attack 11 drops the local supply voltage for the XOR logic gate element 105, the resulting operation of the XOR gate 105 is slowed so that the signal progression through the digital circuit 101-110 is slowed at the XOR gate 105, thereby changing the behavior of the outputs from the depicted circuit 101-110.

To detect such voltage glitches, voltage sensors have been used to monitor glitches on the supply voltage level, but such sensors typically employ a glitch filter having a threshold duration t{filter} as the minimum time required (e.g., 3.5 μs) that the filter input must be asserted before the filter output is asserted. As a result, short-duration voltage glitches on the supply voltage are filtered or removed by the internal glitch filters so that no error response or reaction is generated, allowing the short-duration voltage glitches to maliciously influence the device in the absence of an error response. In addition, voltage sensor solutions typically use analog designs which require fabrication processing that may not be available with digital design fabrication processes. In addition, such analog voltage sensors often must be trimmed. And while there are analog glitch or spike detectors which can detect specific glitch or spike profiles without needing to be trimmed, they do not work reliably with high system noise environments and, due to their peripheral positioning on the chip, they are not suitable for detecting internal or localized voltage glitches which are induced by electro-magnetic fault injection (EMFI) techniques. As seen from the foregoing, there are a number of drawbacks and limitations with conventional glitch detection systems which use analog-based voltage sensors and glitch/spike detectors.

Figure 2:
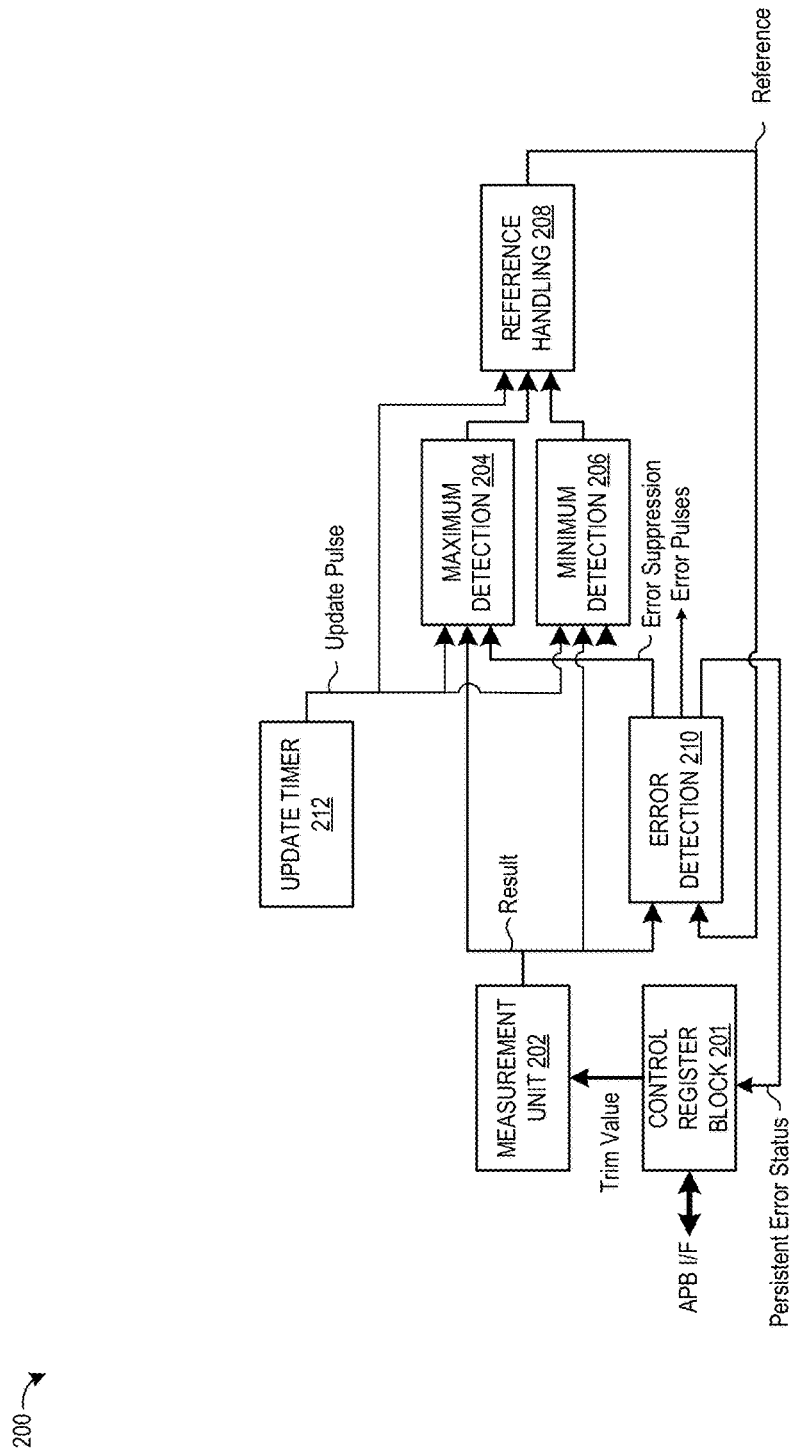
FIG. 2 is a simplified block diagram of a digital glitch detection processing system or unit in accordance with selected embodiments of the present disclosure.

To address these deficiencies and other drawbacks from existing glitch detectors known to those skilled in the art, there is disclosed herein a fully digital glitch security detection system, apparatus, and methodology for continuously protecting against supply voltage glitches by using a measurement unit to capture and convert a glitch-induced delay into a digital measurement result which is evaluated against a computed reference value to generate an error signal if the difference between the digital measurement result and the reference values exceeds a programmable margin. In particular, reference is now made to FIG. 2 which depicts a simplified block diagram of a digital glitch detection processing system 200 which may be embodied as part of a system-on-chip (SoC) device in accordance with selected embodiments of the present disclosure. As depicted, the digital glitch detection processing system 200 may be included in a microcontroller SoC device at the input/output control circuitry which includes a digital measurement unit 202 and an error detection unit 210 for generating one or more error output signals if the digital measurement result differs from a reference value by more than a specified margin. In addition, the digital glitch detection processing system 200 may include an update timer 212, min/max detection units 204, 206, and a reference handling unit 208 for periodically computing the reference value over time based on the minimum and maximum digital measurement result values detected during a specified sampling period. As described more fully below, the digital processing functionality of the digital measurement unit 202 and an error detection unit 210, alone or in combination with the update timer 212, min/max detection units 204, 206, and reference handling unit 208, can be used to protect the SoC device against noisy environments by filtering or removing glitches introduced from noise on the input signals received at or in the SoC device.

Figure 3:
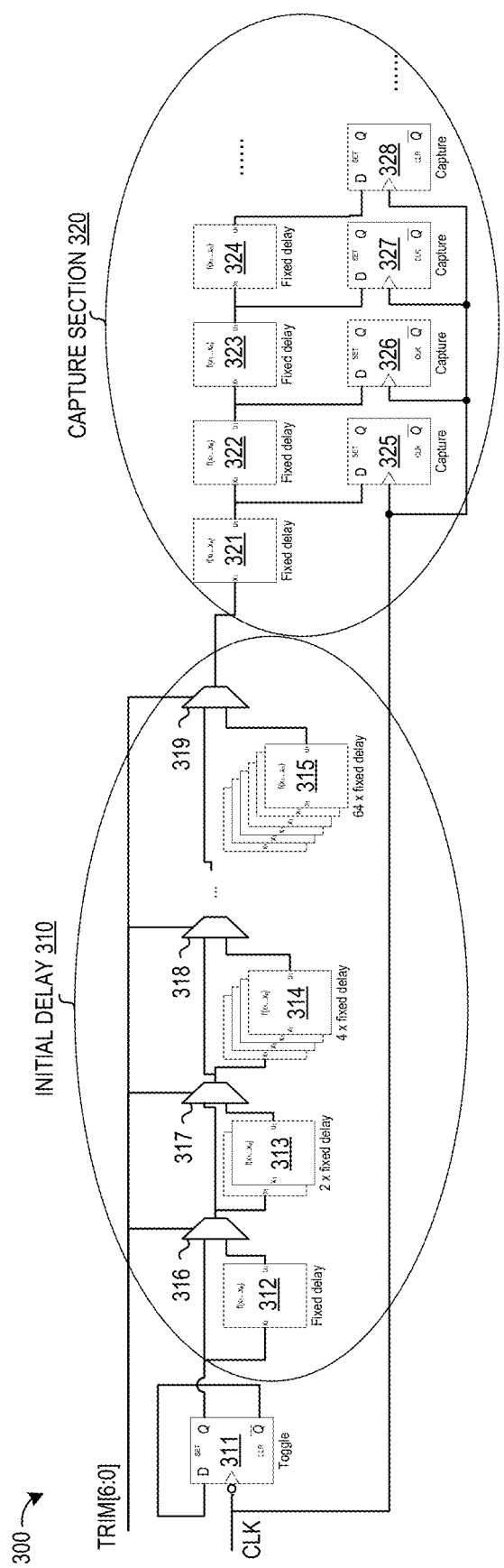
FIG. 3 depicts a schematic diagram of a measurement unit that may be used to implement the digital glitch detector in accordance with selected embodiments of the present disclosure.

For an improved understanding of selected embodiments of the present disclosure, reference is now made to FIG. 3 which illustrates a schematic diagram of a measurement unit 300 that may be used to implement a digital glitch detector functionality disclosed herein. As illustrated, the measurement unit 300 includes a toggle circuit 311, an initial delay section 310, and a capture section 320 which are connected in series to receive a toggle signal from the toggle circuit 311. In particular, the toggle circuit 311 may be implemented with a D flip-flop 311 connected to receive an input clock signal or an inverted input clock signal CLK and to feed back the inverted flip-flop output as a flip-flop input.

At the initial delay section 310, the toggled signal is received by one or more fixed delay elements 312-315 that are programmatically inserted between the toggle flip-flop 310 and the capture section 320 to compensate for process influence on the delay. Each fixed delay element 312-315 may be constructed as an integer multiple n of a unit delay value $f(x_n)$ by connecting n delay elements in series, such that delay element 312 has a single unit delay value, delay element 313 has a two unit delay values, and so on. To control the amount of delay provided by the initial delay section 310, a multi-bit trim setting may be supplied to the multiplexers 316-319 to either introduce or bypass an associated fixed delay element 312-315 into the signal path. In selected embodiments, the required trim setting may be determined once per device (e.g., at production testing) and applied after start-up to ensure that the active measurement range is in the middle of the resolution. This ensures there is sufficient margin for all process corners or variations of the fabrication parameters of the integrated circuit to avoid false positives.

At the capture section 320, the output from the initial delay section 310 is received by a delay line formed with a sequence of delay elements 321-324 and corresponding capture flops 325-328 which are connected, respectively, to the outputs of the delay elements. With this arrangement, a signal output from the initial delay section 310, toggling with each clock, is sent over the delay elements 321-324 and sampled by the capture flops 325-328 to detect a glitch-induced delay in the measurement unit 300 for conversion and output as a digital measurement result. As will be appreciated, if the capture section 320 were connected directly to the toggle flip-flop 311, the first register (e.g., 325) of the capture line 320 would always see the last value of the toggle flop since, even for the slow case, the delay between clock edges is bigger than delay of the delay elements. Therefore, the first flops that would otherwise be part of the initial delay section 310 can be removed while the delay elements 312-315 will be kept. As a result, the initial delay section 310 not only compensates for fabrication process impacts on the measurement result, but also serves to remove the need for unnecessary capture flops in the measurement unit 300.

In operation, the measurement unit 300 measures the delay of the logic gates by sending a toggling signal from the toggle circuit 311 over the delay line formed with delay elements 312-315, 321-324 that may each be constructed from standard logic gates. By clocking the toggle flip-flop 311 with the negative clock edge while the sample flip-flops 325-328 are clocked with the positive clock edge, the number of stand-alone delay elements may be reduced. In other embodiments, the capture event and toggle event can be done on the same edge or inverted edge of the clock signal CLK (0° or 180° phase shifted). In either case, the initial delay has to bridge the time between the clock of the toggle FF 311 and the next rising edge of the capture FF 325-328 under the worst case condition. In addition, the use of the initial delay section 310 to compensate for process, voltage, and temperature (PVT) influence on the delay also reduces the need for unnecessary capture flops in the measurement unit 300. In the capture section 320, the toggle signal is sampled after each delay element 321-324 by the capture circuits 325-328 which are connected, respectively, to the outputs of the delay elements 321-324. For fast operating conditions, the signal will be captured later than for slow operating conditions. As the design is pure RTL, the number of capture registers and delay elements can be defined before synthesis. In selected embodiments, delay elements 312-315, 321-324 are built from standard logic elements, such as inverters, thereby allowing the design of the measurement unit 300 to be quickly adapted to new process nodes. The number of capture flops 325-328 in the capture section 320 may be defined by a specified parameter. The output of the measurement unit 300 is the value inside the capture flops 325-328 (e.g., cap[numcap−1:0]).

Figure 4:
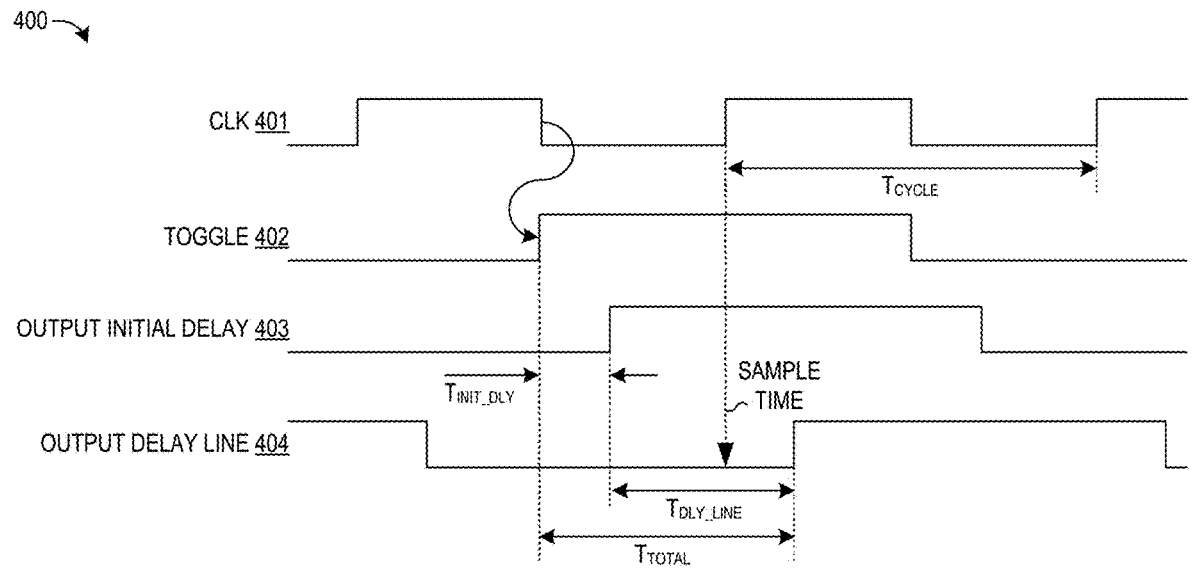
FIG. 4 is a timing diagram illustration of the measurement unit in accordance with selected embodiments of the present disclosure.

For an improved understanding of selected embodiments of the present disclosure, reference is now made to FIG. 4 which illustrates a timing diagram 400 of the input and output signals from the measurement unit 300 shown in FIG. 3. With the input clock signal 401 applied to the toggle circuit 311 and also to the capture flops (e.g., 325) in the capture section 320, each negative clock edge 401 triggers a transition in the toggle signal 402 for input to the initial delay section 310. In addition, each positive clock edge 401 clocks the sample flops 325-328 to capture the outputs from the delay line 321-324. In response to transitions in the toggle signal 402, the initial delay section 310 generates an output initial delay signal 403 which is delayed with respect to the toggle signal 402 by the initial delay value $T_{INIT\_DLY}$ that is set by the trim value. In similar fashion, the capture section 320 responds to transitions in the output initial delay signal 403 to generate an output delay line signal 404 which is delayed with respect to the output initial delay signal 403 by the delay line value $T_{DLY\_LINE}$. As a result, the total time between the negative clock edge 401 and the positive edge on the output delay line signal 404 is $T_{TOTAL}=T_{INIT\_DLY}+T_{DLY\_LINE}$. As seen in this example where the input clock signal CLK 401 has a clock cycle $T_{CYCLE}$, the initial delay $T_{INIT\_DLY}$ provided by the initial delay section 310 has to bridge half a clock cycle under worst case condition.

Once the value of the delay is captured in digitized form by the capture flops 325-328, the measurement unit 301 may also use a time to digital converter to convert the capture results into a numerical value for further digital post-processing steps in order to reduce the number of bits handled in the digital post-processing and to allow easier calculations. For example, the flops 325-328 may capture a 1-0 change or a single 0-1 change, as shown below where the rightmost number belongs to flop 325 (e.g., the LSB) and where the leftmost number belongs to flop 328 (e.g., MSB):

| | |
|---|---|
| Single 1-0 change | 0 0 0 0 0 0 0 1 1 1 1 1 1 1 1 1 |
| Single 0-1 change | 1 1 1 1 1 1 0 0 0 0 0 0 0 0 0 0 |

However, one of the challenges with identifying the delay value is that the captured value in the flops 325-328 may contain more than one 1-0 or 0-1 change, such as shown below when data from the cycle before the last one (cycle-2) is still in the delay line:

| | |
|---|---|
| Dual change | 0 1 1 1 1 1 1 1 1 1 1 1 1 1 0 0 |

Figure 5:
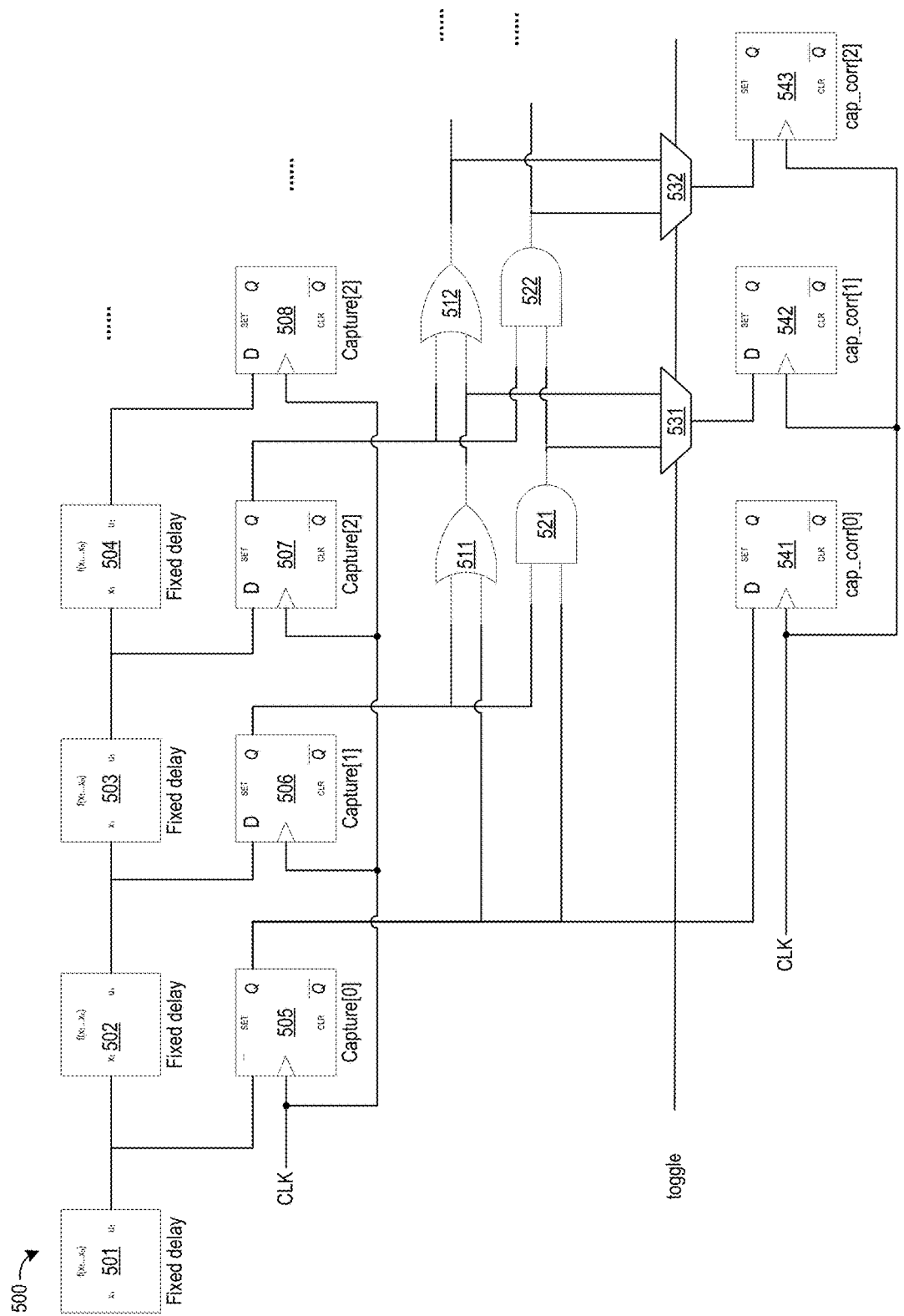
FIG. 5 depicts a schematic diagram of a delay line digital converter circuit for digitally capturing and processing glitch edges while removing edges from a previous measurement cycle from capture result capture result in accordance with selected embodiments of the present disclosure.

To get rid of the second change, the measurement unit 202 may include an edge filtering mechanism for removing the cycle-2 data from the captured values. While any suitable edge filtering mechanism may be used to selectively filter or ignore positive or negative edges, reference is now made to FIG. 5 which is a schematic diagram illustration of a time to digital converter circuit 500 for digitally capturing and processing glitch edges while removing edges from a previous measurement cycle from the capture result in accordance with selected embodiments of the present disclosure. As illustrated, the sequence of delay elements 501-504 are connected in series with corresponding flops 505-508 connected to sample the delay elements in response to positive clock edges CLK. In addition, the time to digital converter circuit 500 includes a first "OR" line 511, 512 and a second "AND" line 521-522 which are each connected to receive outputs from the delay line 501-508 with each clock cycle to remove edge of a previous cycle from the capture result. By connecting each stage of the OR line 511-512 and AND line 521-522 to a corresponding multiplexer circuit 531, 532 for output to corresponding capture flops 541-543 as shown, the values captured at the flops 505-508 are filtered to remove the second change from the capture bus.

For example, the first "OR" line 511, 512 may include a sequence of OR gates is connected in series, with the first OR gate (e.g., 511) connected to receive inputs from a corresponding capture flop (e.g., 506) and a preceding capture flop (e.g., 505), and to generate an OR'd output for the next OR gate (e.g., 512). In turn, each successive OR gate (e.g., 512) is connected to receive inputs from its corresponding capture flop (e.g., 507) and from the preceding OR gate (e.g., 511), and to generate an OR'd output for the next OR gate (not shown). As a result of passing the captured digitized value through the first "OR" line 511-512, only the falling edge is captured as shown below since the OR gates change the underlined value to a "1":

| | |
|---|---|
| Dual change input | 0 1 1 1 1 1 1 1 1 1 1 1 1 1 0 0 |
| OR line output | 1 1 1 1 1 1 1 1 1 1 1 1 1 1 0 0 |

Similarly, the second "AND" line 521, 522 may be formed with a sequence of AND gates connected in series, with the first AND gate (e.g., 521) connected to receive inputs from a corresponding capture flop (e.g., 506) and a preceding capture flop (e.g., 505), and to generate an AND'd output for the next AND gate (e.g., 522). In turn, each successive AND gate (e.g., 522) is connected to receive inputs from its corresponding capture flop (e.g., 507) and from the preceding AND gate (e.g., 521), and to generate an AND'd output for the next AND gate (not shown). As a result of passing the captured value through the second "AND" line 521-522, only the rising edge is captured, as shown below since the AND gates change the underlined values to a "0":

| | |
|---|---|
| Dual change input | 1 1 0 0 0 0 0 0 0 0 0 0 0 1 1 1 |
| AND line output | 0 0 0 0 0 0 0 0 0 0 0 0 0 1 1 1 |

By connecting each stage of the OR line 511-512 and AND line 521-522 to a corresponding multiplexer circuit 531, 532 for output to corresponding capture flops 541-543, either the AND or the OR-line output will be captured, depending on the current value of the toggle signal. This mechanism allows both edges of the toggle signal to be used for measurement, thereby avoiding having "blind cycles" in the detector or the need to duplicate the whole delay line and capturing process which would add circuit area and cost. Also, by capturing the output from the AND/OR lines in the flops 541-543, a worst case timing path in the time-to-digital conversion is avoided, and potential meta-stable states in the capture bus are removed.

After converting the corrected digitized values from the capture flops 541-543 into numerical form, the output from the time to digital processing circuit 500 is forwarded to the post processing part of the digital glitch detector. Referring back to FIG. 2, the digital post-processing is performed by the error detection unit 210, alone or in combination with the update timer 212, min/max detection units 204, 206, and reference handling unit 208. At a minimum, the error detection unit 210 performs digital post-processing to evaluate the digital measurement result from the measurement unit 202 against a reference value to determine if there is a difference that exceeds a programmable positive or negative margin in which case an error is raised. By providing programmable margin settings, the glitch detection sensitivity can be adapted to the different kinds of noise profiles on different SoCs and applications, thereby guaranteeing the best detection rate for glitches while avoiding false positives.

In addition to providing margin settings, the digital post-processing may also provide a mechanism whereby the reference value is modified over time, thereby compensating for the influence of temperature changes during operation on the digital measurement result. To this end, the update timer 212 may be provided which generates a periodic timing reference signal for updating the reference value generated by the reference handling unit 208 and also for updating the min/max values applied at the min/max detection units 204, 206. As disclosed herein, the update timer 212 may be configured to generate update pulses, either manually or upon expiration of a programmable period.

During each timer period that is started with an update (timer) pulse, the maximum detection unit 204 and minimum detection unit 206 are connected and configured to monitor the digital measurement result and to detect the highest and lowest measurement result (min/max) for each timer period which are provided for use by the reference handling unit 208. In this way new min/max values will be provided with every update pulse generated by the update timer 212. If desired, the min/max detection units 204, 206 may be configured in several modes of operation. For example, an "ignore" mode may be used by setting an IGN_ERRx bit in the control register block 201 to "1", so that any result value that is flagged as an error (i.e., as a glitch) will be ignored in the min/max calculation. Otherwise, continuously increasing glitches would reduce the sensitivity of the glitch detector. Setting the IGN_ERRx to "0" will switch this behavior off.

At the end of each timer period, the reference handling unit 208 calculates the reference value based on the min/max values, such as by averaging the reference value with the min/max values using a programmable weight. By providing a programmable weight for computing the reference value, the reference handling unit 208 can suppress big changes in the reference due to changes in the supply noise due to changes in the application.

In the error detection unit 201, the final stage of the glitch detection is performed by evaluating reference value from the reference handling unit 208 against the digital measurement result from the measurement unit 202 to produce one or more output error signals. For example, the error detection unit 201 may generate an error pulse whenever the digital measurement result differs from the reference value by a specified margin value. Such an error signal may be generated based on the actual comparison results which are the clocked-in results of the positive and negative glitch checks (err_pos, err_neg) which are active for a single clock cycle only when they are updated with each cycle. Their purpose is to be connected to a digital test multiplexer and output from the device for analysis purposes. In addition or in alternative, the error signal may be generated based on the persistent comparison results which are the clocked-in results of the positive and negative glitch checks being ORed with the previous values. In this mode, the error signal stays active once set until cleared.

In selected embodiments, the digital glitch detection processing system 200 may be embodied as a hardware circuit component for implementing a digital measurement unit 202 and error detection unit 210, an update timer 212, an min/max detector 204, 206, and a reference handling unit 208 which are connected to be controlled by control values (e.g., trim value, margin value, update timer value) stored in a control register block 201 or otherwise accessible via one or more busses (e.g., APB interface) to automatically detect glitches from digital measurement results which differ from a reference value by a threshold margin value. As will be appreciated, the digital glitch detection processing system 200 may be embodied in whole or in part as physical circuitry and/or as a hardware component in the form of software or code representations of physical circuitry or logical representations convertible into physical circuitry, such as in a hardware description language of any appropriate type. In such hardware component embodiments, the user may provide configuration settings to the digital glitch detection processing system 200, such as by using application software and/or a permanent/hard coded configuration data (e.g., values stored in the device). When stored in configuration data registers of the control register block 201, each system component 202, 204, 206, 208, 210, 212 of the digital glitch detection processing system 200 has access to configuration data.

Figure 6:
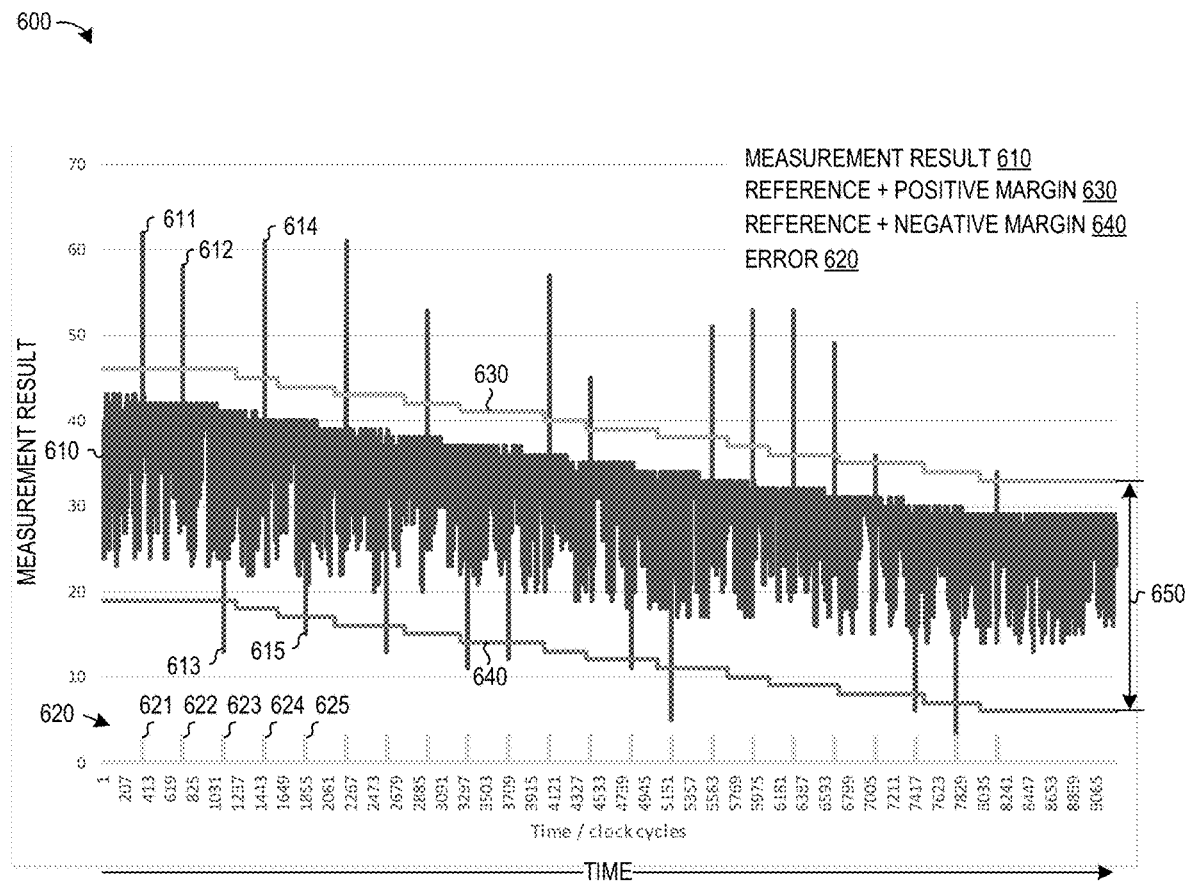
FIG. 6 depicts a graphical representation of digital post-processing operations performed by the digital glitch detector to account for system noise and temperature variations in accordance with selected embodiments of the present disclosure.

For an improved understanding of selected embodiments of the present disclosure, reference is now made to FIG. 6 which depicts a graphical representation 600 of the digital post-processing operations performed by the digital glitch detector to account for system noise and temperature variations. As illustrated, the digital measurement results 610 are generated over time to include noise which might be caused by changes in the application, as well as slow drift in these due to temperature change. In the digital measurement results 610, a moving reference window is applied which includes upper and lower margin values, where the upper margin value 630 is computed by adding a positive margin to the reference value and the lower margin value 640 is computed by adding a negative margin to the reference value. Thus, the reference window is computed from the reference value and the positive and negative margin values, and defines the legal range of results so that any digital measurement result that exceeds the reference window will be flagged as error. In the error waveform 620, each error pulse (e.g., 621-625) corresponds to a digital measurement result (e.g. 611-615) which exceeds the reference window.

By periodically adjusting the reference value based on detected min/max values detected in each timer period, the reference window can move or slide over time with each timer period, thereby eliminating temperature impact on the digital measurement results. As disclosed herein, the speed of adjusting the reference value (and therefore the reference window) may be programmably set. Likewise, the positive and negative margin components may also be programmably set to adjust to noise in the system.

Figure 7:
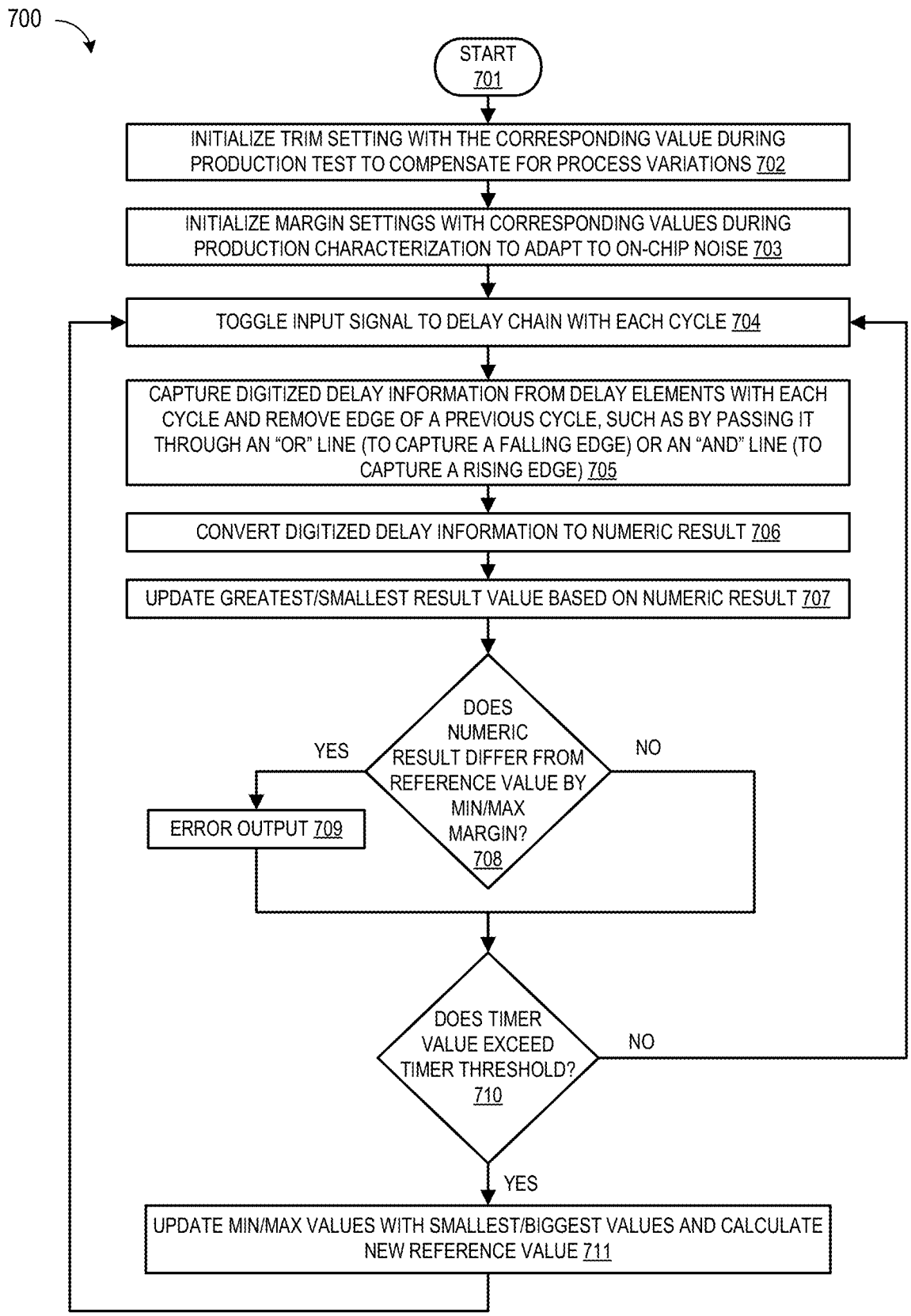
FIG. 7 illustrates a simplified flow chart showing the logic for detecting and preventing glitch attacks on a data processing system in accordance with selected embodiments of the present disclosure.

To provide additional details for an improved understanding of selected first embodiments of the present disclosure, reference is now made to FIG. 7 which depicts a simplified flow chart 700 showing the logic for detecting and preventing glitch attacks on a data processing system. In an example embodiment, the processing shown in FIG. 7 may be performed by a glitch detector hardware engine that is connected to the supply lines in an appropriate way. However, before synthesizing the glitch detector hardware engine for a certain project, the delay elements in the measurement unit must be selected according to the project parameters. In particular, after the process starts (step 701), the trim settings in the glitch detector hardware engine are configured at step 702 by determining a delay value to compensate for process, voltage, and/or temperature (PVT) variations during production testing and then initializing the trim setting for the initial delay section with a corresponding value to compensate for the PVT variations. As will be appreciated, the trim setting configuration may depend on one or more project parameters, such as the delay of the delay element building cell used for constructing the delay line under different conditions (e.g., typical, worst case, and best case conditions). Typically, the delay element building cell will be an inverter with nominal drive strength from the standard library used in the project. Another project parameter could be the capture time (e.g., $t_{cap}$) between the clock of the toggle FF and the clock of the capture FFs.

In addition, the margin settings in the error detection hardware unit are configured at step 703, such as by determining the on-chip noise during product characterization and then initializing the margin settings for the error detection hardware with a corresponding value to adapt to the on-chip noise. While any suitable approach may be used to specify the margin settings, in selected embodiments, the margin settings may be determined by evaluating the noise generated by the system. In selected embodiments, the noise evaluation process may include preparing the chip for test execution, and then performing tests to activate as much activity on the chip as possible to determine a first set of minimum and maximum test result values, and then performing tests to activate as little activity on the chip as possible to determine a second set of minimum and maximum test result values. After identifying the smaller minimum value from the first and second test result values and the bigger maximum value from the first and second test result values, the margin setting may be computed to be greater than half the difference from the smaller minimum value and the bigger maximum value.

At step 704, the delay chain in the measurement unit is toggled with a toggle input signal at each cycle. While any suitable input toggle signal could be used, the control logic and/or hardware at the glitch detector hardware engine may generate the toggle input signal with a toggle flip-flop which is connected to be clocked with negative clock edges and to feed back the inverted output from the toggle flip-flop as an input to the toggle flip-flop while the non-inverted output from the toggle flip-flop is provided to the delay elements in the initial delay section. Simultaneously, a first set of sample flops in the capture section of the measuring unit are connected to be clocked with positive clock edges.

At step 705, the status behind each of the delay chain elements is captured with each cycle to generate a digitized capture result and then processed to filter or remove any edge from a previous cycle from the digitized capture result. By sending the toggle input signal (from step 704) through the delay chain elements and sampling the toggle signal after each delay chain element with the first set of sample flops, the status of each delay chain element captures a digitized result of the delay of the toggle input signal. And while any suitable edge filtering mechanism could be used at step 705, the control logic and/or hardware at the glitch detector hardware engine may be configured to filter or remove edges from previous cycles by passing the digitized result captured in the first set of sample flops through an OR line (to capture a falling edge) or an AND line (to capture a rising edge). With corresponding stages of the OR line and AND line connected to corresponding multiplexer selection circuits which are controlled by a shared toggle signal to output a result to a second set of capture flops, either the AND or the OR-line output will be captured at the second set of capture flops, depending on the current value of the shared toggle signal.

At step 706, the captured digitized delay information captured in the second set of capture flops is converted to numerical form in order to reduce the number of bits handled in the digital post-processing and to allow easier calculations. As will be appreciated, there are a variety of suitable conversion techniques that may be employed at step 706 to provide a numerical representation of the delay value captured at step 705.

At step 707, the largest and smallest result values are updated based on the numerical result obtained at step 706. In selected embodiments, the update operation of step 707 may be implemented with control logic and/or hardware at the glitch detector hardware engine which configures the min/max detection units to detect the smallest and greatest values of the numerical measurement result during a specified update period.

At step 708, the process determines if the numerical measurement result differs from a computed reference value by a min/max margin. In selected embodiments, the difference measure computation of step 708 may be implemented with control logic and/or hardware at the glitch detector hardware engine which configures the error detection unit to evaluate the numerical measurement value against margin settings applied to the reference value during a specified update period. If the numerical measurement value exceeds the min/max margin settings (affirmative outcome to step 708), then an error output signal is issued (step 709) and the process proceeds to step 710. As will be appreciated, the error output signal may be a latched error signal which is connected to interrupt input of CPU or to reset logic. However, if the numerical measurement value does not exceed the min/max margin settings (negative outcome to step 708), then the process proceeds directly to step 710.

At step 710, the process determines if a timer value exceeds a timer threshold, thereby indicating that the min/max values and reference value should be updated. In selected embodiments, the timer update detection step 710 may be implemented with control logic and/or hardware at the glitch detector hardware engine which configures the update timer unit to evaluate a clock cycle count or timer value against a timing reference value which defines the number of clock cycles between two updates pulses. If the timer value does not exceed the timer threshold (negative outcome to step 710), then the process continues to toggle the delay chain (step 704). However, if the timer value does exceed the timer threshold (affirmative outcome to step 710), then the min/max values are updated with the smallest/biggest values captured at step 707, and a new reference value is calculated at step 711 before the process returns to toggling the delay chain (step 704).

As disclosed herein, the glitch security detection method, system, and apparatus may be implemented with standard logic cells that form a delay chain that is connected and controlled by control logic and/or computer program product having program code portions for performing steps of a method and/or for performing functions of a device or system for detecting voltage glitches on a power supply line, delay line logic, or its local power supply line with a measurement process that provides process and temperature compensation when evaluating measurement results against a reference value. Although embodiments are described in the context of monitoring voltage supply lines, the proposed glitch processing hardware method, system, and apparatus may be implemented to detect and protect against voltage glitches in a wide range of device applications.

Some of the above embodiments, as applicable, may be implemented using a variety of different data processing systems. For example, although FIG. 2 and the discussion thereof describe an exemplary data processing architecture of microcontroller SoC device in which a glitch processing unit is employed, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architecture depicted herein is merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

By now it should be appreciated that there has been provided a digital glitch detection apparatus, method, program code, and system for preventing voltage glitch attacks on a monitored line, such as an internal bus, I/O port, or power supply or reset line of a data processing system. In the disclosed apparatus, method, program code, and system, a glitch processing hardware unit provides a toggle signal over a plurality of clock cycles to a delay chain having a configurable initial delay circuit and a plurality of delay elements formed with standard logic cells and connected to a monitored line, where the initial delay circuit is configured with a trim setting to impose an initial delay to compensate for process variations. In addition, the glitch processing hardware unit also captures logic values from the plurality of delay elements in a corresponding plurality of capture flops to provide a digitized representation of a delay chain value during a sampling period. In selected embodiments, the glitch process hardware unit captures logic values from the plurality of delay elements by capturing logic values from the plurality of delay elements in a corresponding plurality of interim capture flops to provide a first digitized representation of the delay value during the sampling period; passing the first digitized representation through an AND gate line to remove a second change in the first digitized representation resulting from a previous measurement cycle; passing the first digitized representation through an OR gate line to remove a second change in the first digitized representation resulting from a previous measurement cycle; and capturing logic values from the AND gate line or OR gate line in a corresponding plurality of corrected capture flops using a toggled plurality of multiplexers to provide a digitized representation of the delay value during the sampling period. After converting the digitized representation of the delay value into a numerical measurement result for the sampling period, the glitch processing hardware unit evaluates the numerical measurement result against a reference value to determine if a difference between the numerical measurement result and reference value exceeds a programmable margin. In selected embodiments, the programmable margin may be set by performing tests to generate on-chip noise during production characterization to detect minimum and maximum test result values and then setting the programmable margin setting to be greater than half a difference measure between the minimum and maximum test result values. If the difference between the numerical measurement result and reference value exceeds the programmable margin, the glitch processing hardware unit generates an output error signal. In addition, the glitch processing hardware unit may also monitor the numerical measurement results for a maximum measurement value and minimum measurement value during the sampling period, and then compute an updated reference value by averaging the reference value with the maximum measurement value and minimum measurement value after a predetermined number of clock cycles for use in evaluating the numerical measurement result against the updated reference value in a subsequent sampling period. In such embodiments, the glitch processing hardware unit may compute the updated reference value by applying a programmable weight to the reference value. In addition, the glitch processing hardware unit may also adapt the reference value over a plurality of sampling periods to compensate for temperature effects on the numerical measurement result. In selected embodiments, the initial delay circuit, the plurality of delay elements, and the plurality of capture flops are formed with standard digital logic cells which are connected to capture the digitized representation of a delay value in response to an internal or localized voltage glitch which is induced by electro-magnetic fault injection (EMFI) techniques.

In another form, there is provided a glitch processing hardware system, apparatus, method, and program code for preventing voltage glitch attacks on a monitored line, such as an internal bus or signal line, I/O port, power supply, reset line, or clock line of a data processing system. In the disclosed apparatus, method, program code, and system, the glitch processing hardware system includes a measurement hardware unit, a digital converter hardware unit, and an error detection unit. Formed with standard logic cells and connected to a monitored line, the measurement hardware unit includes a configurable initial delay circuit, a plurality of delay elements, and a plurality of capture flops, where the initial delay circuit imposes an initial delay to compensate for process variations, and where the plurality of capture flops is connected to capture logic values from the plurality of delay elements to provide a digitized representation of a delay value during a sampling period. In selected embodiments, the measurement hardware unit includes a first plurality of interim capture flops connected to capture logic values from the plurality of delay elements to provide a first digitized representation of the delay value during the sampling period; an AND gate line connected to receive the first digitized representation to remove a first change in the first digitized representation resulting from a previous measurement cycle; an OR gate line connected to receive the first digitized representation to remove a second change in the first digitized representation resulting from a previous measurement cycle; and a plurality of corrected capture flops connected to capture logic values from the AND gate line and OR gate line using a toggled plurality of multiplexers to provide a second digitized representation of the delay value during the sampling period. The digital converter hardware unit is connected to convert the digitized representation of the delay value into a numerical measurement result for the sampling period. The error detection unit is connected to generate an output error signal if a difference between the numerical measurement result and a reference value exceeds a programmable margin indicating a positive or negative glitch on the monitored line. In selected embodiments, the glitch processing hardware system includes a reference handling hardware unit connected to adapt the reference value over a plurality of sampling periods to compensate for temperature effects on the numerical measurement result. In other embodiments, the glitch processing hardware system includes a detection hardware unit and a reference handling hardware unit. The detection hardware unit may be connected to monitor the numerical measurement results for a maximum measurement value and minimum measurement value during the sampling period. In addition, the reference handling hardware unit may be connected to compute an updated reference value by averaging the reference value with the maximum measurement value and minimum measurement value after a predetermined number of clock cycles for use in evaluating the numerical measurement result against the updated reference value in a subsequent sampling period. In selected embodiments, the reference handling hardware unit computes the updated reference value by applying a programmable weight to the reference value. In selected embodiments, the error detection unit is configured with the programmable margin by performing tests to generate on-chip noise during production characterization, detecting minimum and maximum test result values, and computing the programmable margin to be at least half a difference measure between the minimum and maximum test result values.

In yet another form, there is provided an integrated circuit (IC) System-on-Chip (SoC) device, system, apparatus, method, and program code for detecting voltage glitch attacks on a monitored line. In particular, the disclosed IC SoC includes a monitored line, a digital measurement unit for providing a numerical measure of a glitch-induced delay, and an error detector for generating an error signal. The disclosed digital measurement unit is formed with standard cells and includes a toggle signal generator for generating a toggle signal. The digital measurement unit also includes an initial delay circuit connected to generate a delayed toggle signal by imposing an initial delay on the toggle signal to compensate for process variations in the fabrication of the SoC device. In selected embodiments, the initial delay circuit is configured with a trim setting to set the initial delay setting to compensate for process variations. In addition, the digital measurement unit includes a delay line formed with a plurality of delay elements connected to measure a glitch-induced delay in the delayed toggle signal. The digital measurement unit also includes a plurality of capture devices connected to capture logic values from the plurality of delay elements which provide a digitized representation of the glitch-induced delay. In addition, the digital measurement unit includes a digital converter unit connected to convert the digitized representation of the glitch-induced delay into a numerical measurement result for the sampling period. In selected embodiments, the digital converter unit includes a first plurality of interim capture flops connected to capture logic values from the plurality of delay elements in the delay line to provide a first digitized representation of the glitch-induced delay during the sampling period; an AND gate line connected to receive the first digitized representation to remove a first change in the first digitized representation resulting from a previous measurement cycle; an OR gate line connected to receive the first digitized representation to remove a second change in the first digitized representation resulting from a previous measurement cycle; and a toggled plurality of multiplexers connected to provide logic values from the AND gate line and OR gate line to the plurality of capture devices to provide a second digitized representation of the glitch-induced delay during the sampling period. The disclosed error detector is configured and connected to apply digital post-processing to the numerical measurement result for generating an error signal if a difference between the numerical measurement result and a computed reference value exceeds a programmable margin. In selected embodiments, the error detector is configured to modify the computed reference value over a plurality of sampling periods to compensate for temperature effects on the numerical measurement result. In selected embodiments, the disclosed IC SoC also includes a min/max detector connected to monitor the numerical measurement results for a maximum measurement value and minimum measurement value during the sampling period, and a reference handling hardware unit connected to compute an updated reference value by averaging the computed reference value with the maximum measurement value and minimum measurement value after a predetermined number of clock cycles for use in evaluating the numerical measurement result against the updated reference value in a subsequent sampling period.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Although the described exemplary embodiments disclosed herein are directed to an exemplary glitch detector hardware engine, the present invention is not necessarily limited to the example embodiments illustrate herein, and various embodiments of the circuitry and methods disclosed herein may be implemented with other devices and software components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   transitioning a toggle signal for each cycle of a clock signal and providing the toggle signal to a delay chain comprising a configurable initial delay circuit and a plurality of delay elements formed with standard logic cells and connected to a monitored line, where the initial delay circuit is configured with a trim setting to impose an initial delay to compensate for process variations;
   capturing logic values from the plurality of delay elements in a corresponding plurality of capture flops to provide a digitized representation of a delay value during a predetermined sampling period based on the clock signal;
   converting the digitized representation of the delay value into a numerical measurement result for the predetermined sampling period;
   evaluating the numerical measurement result against a reference value to determine if a difference between the numerical measurement result and reference value exceeds a programmable margin; and
   generating an output error signal if the difference between the numerical measurement result and reference value exceeds the programmable margin.

2. The method of claim 1, where the monitored line comprises an internal bus, I/O port, or power supply or reset line of a data processing system.

3. The method of claim 1, where capturing logic values from the plurality of delay elements comprises:
   capturing logic values from the plurality of delay elements in a corresponding plurality of interim capture flops to provide a first digitized representation of the delay value during the predetermined sampling period;
   passing the first digitized representation through an AND gate line to remove a second change in the first digitized representation resulting from a previous measurement cycle;
   passing the first digitized representation through an OR gate line to remove a second change in the first digitized representation resulting from a previous measurement cycle; and
   capturing logic values from the AND gate line and OR gate line in a corresponding plurality of corrected capture flops using a toggled plurality of multiplexers to provide a second digitized representation of the delay value during the predetermined sampling period.

4. The method of claim 1, further comprising:
   monitoring the numerical measurement results for a maximum measurement value and minimum measurement value during the predetermined sampling period; and
   computing an updated reference value by averaging the reference value with the maximum measurement value and minimum measurement value after a predetermined number of clock cycles for use in evaluating the numerical measurement result against the updated reference value in a subsequent predetermined sampling period.

5. The method of claim 4, where computing the updated reference value comprises applying a programmable weight to the reference value.

6. The method of claim 1, further comprising adapting the reference value over a plurality of predetermined sampling periods to compensate for temperature effects on the numerical measurement result.

7. The method of claim 1, further comprising setting the programmable margin by performing tests to generate on-chip noise during production characterization to detect minimum and maximum test result values and then setting the programmable margin setting to be greater than half a difference measure between the minimum and maximum test result values.

8. The method of claim 1, where the initial delay circuit, the plurality of delay elements, and the plurality of capture flops are formed with standard digital logic cells which are connected to capture the digitized representation of a delay value in response to an internal or localized voltage glitch which is induced by electro-magnetic fault injection (EMFI) techniques.

9. A processing system, comprising:
a measurement hardware unit formed with standard logic cells and connected to a monitored line, the measurement hardware unit comprising a configurable initial delay circuit, a plurality of delay elements, a plurality of capture flops, and an edge filtering circuit, where the initial delay circuit imposes an initial delay to compensate for process variations, where each of the plurality of capture flops is connected to capture logic values from a corresponding one of the plurality of delay elements to provide a digitized representation of a delay value during a sampling period, and where the edge filtering circuit filters the first digitized representation of the delay value to remove a change in the first digitized representation resulting from a previous measurement cycle and to provide a second digitized representation of the delay value;
a digital converter hardware unit connected to convert the second digitized representation of the delay value into a numerical measurement result for the sampling period; and
an error detection unit connected to generate an output error signal if a difference between the numerical measurement result and a reference value exceeds a programmable margin indicating a positive or negative glitch on the monitored line.

10. The processing system of claim 9, where the monitored line comprises an internal bus or signal line, I/O port, power supply, reset line, or clock line of a data processing system.

11. The processing system of claim 9, where the measurement hardware unit comprises:
a first plurality of interim capture flops connected to capture logic values from the plurality of delay elements to provide the first digitized representation of the delay value during the sampling period;
an AND gate line connected to receive the first digitized representation to remove a first change in the first digitized representation resulting from a previous measurement cycle;
an OR gate line connected to receive the first digitized representation to remove a second change in the first digitized representation resulting from a previous measurement cycle; and
a plurality of corrected capture flops connected to capture logic values from the AND gate line and OR gate line using a toggled plurality of multiplexers to provide the second digitized representation of the delay value during the sampling period.

12. The processing system of claim 9, further comprising:
a detection hardware unit connected to monitor the numerical measurement results for a maximum measurement value and minimum measurement value during the sampling period; and
a reference handling hardware unit connected to compute an updated reference value by averaging the reference value with the maximum measurement value and minimum measurement value after a predetermined number of clock cycles for use in evaluating the numerical measurement result against the updated reference value in a subsequent sampling period.

13. The processing system of claim 12, where the reference handling hardware unit computes the updated reference value by applying a programmable weight to the reference value.

14. The processing system of claim 9, further comprising a reference handling hardware unit connected to adapt the reference value over a plurality of sampling periods to compensate for temperature effects on the numerical measurement result.

15. The processing system of claim 9, where the error detection unit is configured with the programmable margin by performing tests to generate on-chip noise during production characterization, detecting minimum and maximum test result values, and computing the programmable margin to be at least half a difference measure between the minimum and maximum test result values.

16. An integrated circuit (IC) device, comprising:
a monitored line;
a digital measurement unit formed with standard cells comprising:
a toggle signal generator for generating a toggle signal that transitions each cycle of a clock signal,
an initial delay circuit connected to the monitored line and configured to generate a delayed toggle signal by imposing an initial delay on the toggle signal to compensate for process variations in the fabrication of the IC device,
a delay line comprising a plurality of delay elements connected to the monitored line and the initial delay circuitry and configured to measure a glitch-induced delay in the delayed toggle signal,
a plurality of capture devices, each of the plurality of capture devices connected to capture logic values from a corresponding one of the plurality of delay elements after a predetermined sampling period initiated by each transitioning of the toggle signal and terminated by the clock signal, where the captured logic values provide a digitized representation of the glitch-induced delay, and
a digital converter unit connected to convert the digitized representation of the glitch-induced delay into a numerical measurement result for the predetermined sampling period; and
an error detector configured to apply digital post-processing to the numerical measurement result for generating an error signal if a difference between the numerical measurement result and a computed reference value exceeds a programmable margin.

17. The IC device of claim 16, where the initial delay circuit is configured with a trim setting to set the initial delay setting to compensate for process variations.

18. The IC device of claim 16, where the error detector is configured to modify the computed reference value over a plurality of predetermined sampling periods to compensate for temperature effects on the numerical measurement result.

19. The IC device of claim 16, where the digital converter unit comprises:

a first plurality of interim capture flops connected to capture logic values from the plurality of delay elements in the delay line to provide a first digitized representation of the glitch-induced delay during the predetermined sampling period;

an AND gate line connected to receive the first digitized representation to remove a first change in the first digitized representation resulting from a previous measurement cycle;

an OR gate line connected to receive the first digitized representation to remove a second change in the first digitized representation resulting from a previous measurement cycle; and a toggled plurality of multiplexers connected to provide logic values from the AND gate line and OR gate line to the plurality of capture devices to provide a second digitized representation of the glitch-induced delay during the predetermined sampling period.

20. The IC device of claim 16, further comprising:

a min/max detector connected to monitor the numerical measurement results for a maximum measurement value and minimum measurement value during the predetermined sampling period; and a reference handling hardware unit connected to compute an updated reference value by averaging the computed reference value with the maximum measurement value and minimum measurement value after a predetermined number of clock cycles for use in evaluating the numerical measurement result against the updated reference value in a subsequent predetermined sampling period.

* * * * *